3,828,067
N-(INDAZOLYL-N¹-METHYL) DIALKANOLAMINES
Pasquale P. Minieri, Woodside, N.Y., assignor to
Tenneco Chemicals, Inc.
No Drawing. Filed Nov. 20, 1972, Ser. No. 308,156
Int. Cl. C07d 49/18
U.S. Cl. 260—310 C          3 Claims

ABSTRACT OF THE DISCLOSURE

Compounds that have the structural formula

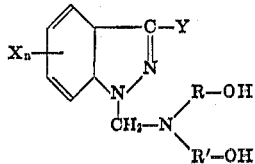

wherein X represents halogen, nitro, amino, acetamino, or (halobenzylidene)amino; Y represents hydrogen or halogen; R and R' each represents an alkylene group having 1 to 8 carbon atoms; and $n$ represents a number in the range of 0 to 3 are used to control the growth of fungi and bacteria. Illustrative of these compounds is N-(3-chloroindazolyl-N¹-methyl)diethanolamine.

---

This invention relates to N-(indazolyl-N¹-methyl) dialkanolamines and to the use of these compounds in the control of the growth of bacteria, fungi, and other microorganisms.

In accordance with this invention, it has been found that certain N - (indazolyl - N¹ - methyl)dialkanolamines have unusual and valuable activity as biocides. These compounds may be represented by the structural formula

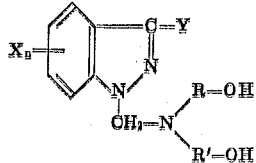

wherein X represents halogen (chlorine, bromine, fluorine, or iodine), nitro, amino, acetamino, (chlorobenzylidene) amino, (bromobenzylidene)amino, (fluorobenzylidene) amino, or (iodobenzylidene)amino; Y represents hydrogen, halogen(chlorine, bromine, fluoroine, or iodine); R and R' each represents an alkylene group having 1 to 8 carbon atoms; and $n$ represents a number in the range of 0 to 3.

Illustrative of these compounds are the following:

N-(indazolyl-N¹-methyl)diethanolamine,
N-(3-chloroindazolyl-N¹-methyl)dipropanolamine,
N-(3-bromo-5,6-dinitroindazolyl-N¹-methyl)dioctanol-
N-(3,5-difluoroindazolyl-N¹-methyl)dibutanolamine,
N-(3,6-diiodoindazolyl-N¹-methyl)dihexanolamine,
N-(6-acetaminoindazolyl-N¹-methyl)dipropanolamine,
N-(4,7-diaminoindazolyl-N¹-methyl)dimethanolamine,
N-[6-(chlorobenzylidene)aminoindazolyl-N¹-methyl] ethanolpropanolamine,
N-(4,5,7-trichloroindazolyl-N¹-methyl)-diethanolamine,
N-(5,7-dichloroindazolyl-N¹-methyl)diethanolamine,
N-[3-chloro-6-(p-bromobenzylidene)aminoindazolyl-N¹- methyl]propanolbutanolamine,
N-(3,4,5,7-tetrabromoindazolyl-N¹-methyl)methanol- propanolamine, and the like.

Particularly effective as biocides are the compounds having the aforementioned structure in which X represents chlorine or nitro, Y represents chlorine or hydrogen, and R and R' each represents an alkylene group having 2 or 3 carbon atoms. Among the preferred compounds are N-(3-chloroindazolyl-N¹-methyl)diethanolamine,
N-(5,7-dichloroindazolyl-N¹-methyl)diethanolamine,
N-(4,5,7-trichloroindazolyl-N¹-methyl)ethanolpropanol- amine,
N-(3,5,7-trichloroindazolyl-N¹-methyl)dipropanolamine,
N-(3-chloro-6-nitroindazolyl-N¹-methyl)dipropanol- amine, and
N-(5,6-dinitroindazolyl-N¹-methyl)dipropanolamine.

The novel compounds may be prepared by any suitable and convenient procedure. For example, they may be prepared by heating an N¹-hydroxymethylindazole with the appropriate alkanolamine. The reaction is generally carried out in a solvent, such as toluene, acetone, or tetrahydrofuran, at the reflux temperature of the reaction mixture.

The N-(indazolyl-N¹-methyl)dialkanolamines can be used to inhibit or prevent the growth of a wide variety of fungi and bacteria.

In a preferred embodiment of the invention, the novel amines are used to impart fungal and bacterial resistance to surface-coating composition including both organic solvent-based and water based coating systems. They are particularly valuable as biocides in coatings that contain as their resinous binder either an oleoresinous material or a water-insoluble synthetic linear addition polymer.

Among the surface-coating compositions in which the compounds of this invention can be used as the biocide are organic solvent based systems that contain such oleoresinous binders as drying oils, such as linseed oil, tung oil, soybean oil, dehydrated castor oil, safflower oil, or fish oil, bodied drying oils; blends of drying oils or bodied drying oils with a resin component such as limed rosin, an ester gum, or phenolic resin; oleoresinous varnishes formed by heating one of the aforementioned resins with one or more drying oils or bodied drying oils; alkyd resins, which are resinous products resulting from the reaction of a polyhydric alcohol, such as pentaerythritol of glycerol, with a dicarboxylic acid, such as phthalic anhydride, and fatty acids; and mixtures thereof.

The novel amines can also be used as the biocide in aqueous dispersions that contain about 10 percent to 60 percent by weight of a water-insoluble resinous binder that is an oleoresinous binder as hereinbefore defined, a synthetic linear addition binder, or a mixture of an oleoresinous binder and a synthetic linear addition binder. The aqueous dispersions of synthetic linear addition polymers are ordinarily prepared by the emulsion polymerization of ethylenically-unsaturated compounds, especially those of monoethylenically-unsaturated character, although butadiene, chlorobutadiene, and isoprene may be used to some extent. Illustrative of the synthetic linear addition polymers that can be used as the resinous binder in the aqueous dispersions are polyvinyl acetate; polyvinyl butyrate; polyvinyl chloride; copolymers of vinyl acetate with acrylonitrile; copolymers of vinyl chloride with vinyl acetate, acrylonitrile or vinylidene chloride; polyethylene; polyisobutylene; polystyrene; copolymers of styrene with maleic anhydride or butadiene; copolymers of acrylonitrile with butadiene; copolymers of methacrylic acid esters of alcohols having 1 to 8 carbon atoms with vinyl acetate, vinyl chloride, acrylonitrile, or styrene; copolymers of acrylic acid esters of alcohols having 1 to 8 carbon atoms with vinyl acetate, vinyl chloride, acrylonitrile, or styrene; and mixtures thereof.

Only a small amount of the N-(indazolyl-N¹-methyl)di- alkanolamine need be present in the surface-coating compositions. As little as 0.10 percent of one or more of these compounds, based on the weight of the composition, will bring about an appreciable improvement in the resistance of the compositions to attack by fungi and bacteria. Three percent or more can be used, but these larger amounts generally do not provide further improvement in the properties of the surface-coating compositions and for this reason are not ordinarily used. In most cases about 1 percent to 2 percent of the biocidal compound, based on the weight of the composition, is used.

The invention is further illustrated by the following examples.

EXAMPLE 1

A mixture of 18.3 grams (0.1 mole) of $N^1$-hydroxymethyl - 3 - chloroindazole, 10.5 grams (0.1 mole) of diethanolamine, and 150 ml. of toluene was heated at its reflux temperature until 1.8 ml. (0.1 mole) of water had been evolved. It was heated at its reflux temperature for an additional hour, cooled in an ice bath, and then filtered. The product was washed with toluene and dried at 40° C. under reduced pressure. There was obtained 26.1 grams (97% yield) of N-(3-chloroindazolyl-$N^1$-methyl)diethanolamine, which was a white solid that melted at 102.5°–106.5° C. and that contained 12.3% Cl (calculated, 13.1% Cl).

EXAMPLE 2

A mixture of 21.7 grams (0.1 mole) of $N^1$-hydroxymethyl-5,7-dichloroindazole, 10.5 grams (0.1 mole) of diethanolamine, and 150 ml. of toluene was heated at its reflux temperature until 1.8 ml. (0.1 mole) of water had been evolved. It was heated at its reflux temperature for an additional fifteen minutes after which 75 ml. of solvent was distilled off under vacuum at 70° C. and the concentrate was cooled. The separated solids were filtered off, washed with cold toluene and the combined filtrate and wash was stripped to dryness under vacuum to isolate the product. There was obtained 21.4 grams (70.5% yield) of N - (5,7 - dichloroindazolyl - $N^1$ - methyl)diethanolamine, which was a yellow semi-solid and that contained 24.1% Cl (calculated 23.4% Cl).

EXAMPLE 3

A. A polyvinyl acetate emulsion paint was prepared by mixing together the following materials:

| | Parts by Weight |
|---|---|
| Water | 280 |
| Potassium pyrophosphate | 3 |
| Calcium metasilicate | 135 |
| Titanium dioxide (rutile) | 220 |
| 2% Aqueous solution of methylcellulose | 200 |
| Diethyl ether of diethylene glycol | 37 |
| 55% Aqueous dispersion of polyvinyl acetate | 350 |

B. An acrylic paint was prepared by mixing together the following materials:

| | Parts by Weight |
|---|---|
| Water | 250 |
| Acrylic acid resin (100% solids) (Acryloid B–66) | 385 |
| Monoethyl ether of ethylene glycol | 259 |
| Titanium dioxide | 143 |
| Aluminum silicate | 45 |
| Magnesium silicate | 98 |

C. An exterior house paint was prepared by mixing together the following materials:

| | Parts by Weight |
|---|---|
| Basic lead carbonate | 288 |
| Zinc oxide | 232 |
| Titanium dioxide (rutile) | 149 |
| Talc | 260 |
| Linseed oil | 242 |
| Bodied linseed oil | 114 |
| Mineral spirits | 114 |
| Antiskinning agent (Exkin 2) | 2 |
| Manganese naphthenate (6% Mn) | 2.27 |
| Lead naphthenate (24% Pb) | 11.3 |

D. To samples of these paints was added either 2 percent by weight of one of the compounds of this invention or 2 percent by weight of a comparative biocide.

EXAMPLE 4

The acrylic paint, the polyvinyl acetate paint, and the oil based paint whose preparation is described in Example 3 were evaluated by means of an agar diffusion assay. In this test agar is inoculated with the test organism, the treated paint is placed in a well cut from the agar, and after incubation at 28° C. and 85–95% relative humidity, the activity of the biocide is measured by zones of inhibition. The biocidal compounds tested and the results obtained are given in the following table. In this table ZO: Zone of inhibition in mm.
0: No growth; no zone of inhibition
Tr: Trace of zone of inhibition
—: Not tested
Bacteria
    A—*Bacillus subtilis*
    B—*Aerobacter aerogenes*
    C—*Pseudomonas aeruginosa*
Fungi
    D—*Pullularia pullulans*
    E—*Penicillium crustosum*
    F—*Aspergillus niger*

The compounds tested and the results obtained are set forth in the following table.

TABLE

| | | | Biocidal activity | | | | | |
|---|---|---|---|---|---|---|---|---|
| | | | Bacteria | | | Fungi | | |
| Biocide | Paint | pH | A | B | C | D | E | F |
| Product of Example 1 | Acrylic | 9.0 | Tr | 0 | ZO-5 | ZO-1 | ZO-1 | ZO-1 |
| | PVA | 8.3 | ZO-5 | ZO-2 | ZO-4 | ZO-1 | ZO-3 | Tr |
| | Oil | — | — | — | — | ZO-1 | ZO-1 | Tr |
| Product of Example 2 | Acrylic | 9.1 | ZO-1 | Tr | ZO-1 | 0 | 0 | Tr |
| | PVA | 8.0 | ZO-1 | Tr | Tr | ZO-1 | ZO-2 | Tr |
| | Oil | — | — | — | — | Tr | ZO-1 | Tr |
| Bis(phenylmercury)dodecenylsuccinate (Super Ad-it) | Acrylic | 8.4 | ZO-9 | ZO-5 | ZO-5 | ZO-8 | ZO-3 | ZO-9 |
| | PVA | 6.9 | ZO-10 | ZO-8 | ZO-5 | ZO-10 | ZO-6 | ZO-17 |
| | Oil | — | — | — | — | ZO-7 | ZO-4 | ZO-10 |

Each of the other N-(indazolyl-$N^1$-methyl)dialkanolamines disclosed herein can be used in a similar way to protect surface-coating compositions from deterioration resulting from attack by fungi and bacteria.

What is claimed is:
1. A compound having the structural formula

$$X_n \underset{\underset{CH_2-N}{\overset{|}{N}}}{\overset{\text{(indazole)}}{\diagup}} \begin{matrix} C-Y \\ N \\ R-OH \\ R'-OH \end{matrix}$$

wherein X represents halo; Y represents halo or hydrogen; R and R' each represents alkylene of 1 to 8 carbon atoms; when Y is halo, $n$ represents a number in the range of 0 to 3; and when Y is hydrogen, $n$ represents a number in the range of 1 to 3.

2. N-(3-Chloroindazolyl-N¹-methyl)diethanolamine.
3. N - (5,7 - Dichloroindazolyl-N¹-methyl)diethanolamine.

References Cited

Pozharskii et al.: J. Gen. Chem. USSR, Vol. 34, pp. 3409–11 (1964).

Zhao et al.: Chem. Abst., Vol. 54, column 1500 (1960).

Zhao et al.: Zhur. Obshchei Khim., Vol. 29, pp. 1012–20 (1959).

NATALIE TROUSOF, Primary Examiner

U.S. Cl. X.R.

106—15 R, 15 AF, 18; 260—29.6 MN, 89.1; 424—273